US00RE46172E

(19) United States
(12) Reissued Patent
Dal Dosso et al.

(10) Patent Number: US RE46,172 E
(45) **Date of Reissued Patent: *Oct. 4, 2016**

(54) CARTON CLAMP ARM WITH ADJUSTABLE PIVOT BLOCK

(71) Applicant: Cascade Corporation, Fairview, OR (US)

(72) Inventors: Andrea Dal Dosso, Verona (IT); Brian Sinclair White, Heidelberg (AU)

(73) Assignee: Cascade Corporation, Fairview, OR (US)

( * ) Notice: This patent is subject to a terminal disclaimer.

(21) Appl. No.: 14/837,839

(22) Filed: Aug. 27, 2015

Related U.S. Patent Documents

Reissue of:
(64) Patent No.: 8,517,440
Issued: Aug. 27, 2013
Appl. No.: 13/615,116
Filed: Sep. 13, 2012

U.S. Applications:
(60) Provisional application No. 61/621,927, filed on Apr. 9, 2012.

(51) Int. Cl.
*B66F 9/18* (2006.01)

(52) U.S. Cl.
CPC ..... *B66F 9/183* (2013.01)

(58) Field of Classification Search
CPC ..... B66F 9/183
USPC ..... 294/106, 902; 414/621
See application file for complete search history.

(56) References Cited

U.S. PATENT DOCUMENTS 2,674,387 A 4/1954 Ehmann
2,675,935 A 4/1954 Thurow
2,681,162 A 6/1954 Ehmann
2,782,066 A * 2/1957 Lord ..... B66F 9/183 294/119.1
2,844,403 A 7/1958 Farmer et al.
3,145,866 A * 8/1964 Farmer et al. ..... 414/621
3,182,837 A 5/1965 Farmer et al.
3,433,376 A 3/1969 Jordan
3,643,827 A 2/1972 Link
3,971,585 A * 7/1976 LaBudde ..... 294/207

(Continued)

FOREIGN PATENT DOCUMENTS

DE 1031219 5/1958
EP 1371601 A2 12/2003

(Continued)

OTHER PUBLICATIONS

PCT ISA/US, Int'l Search Report and Written Opinion, PCT/US13/21557, Mar. 19, 2013, 8 pages.

(Continued)

*Primary Examiner* — William Doerrler
(74) *Attorney, Agent, or Firm* — Chernoff, Vilhauer, McClung & Stenzel LLP

(57) ABSTRACT

A lift truck clamp arm assembly for engaging large cartons, which may contain large household appliances. Pivoting clamp pad support assemblies are adjustable to vary a radial spacing between a pivot pin and a clamp pad supported on the clamp arm assembly by attachment to the adjustable clamp pad support assembly, to provide desired pressure concentrations at selected parts of a carton to be gripped.

64 Claims, 6 Drawing Sheets

(56) References Cited

U.S. PATENT DOCUMENTS

| | | | | |
|---|---|---|---|---|
| 4,605,255 | A | 8/1986 | Olson | |
| 5,033,933 | A * | 7/1991 | Sinclair et al. | 414/607 |
| 8,714,610 | B2 * | 5/2014 | Dal Dosso | B66F 9/183 294/106 |
| 2006/0073001 | A1 | 4/2006 | Chase | |

FOREIGN PATENT DOCUMENTS

| | | |
|---|---|---|
| EP | 1997771 B1 | 12/2008 |
| GB | 812990 | 5/1959 |
| GB | 829369 | 3/1960 |
| GB | 834402 | 5/1960 |
| GB | 908845 | 10/1962 |
| JP | H07315789 | 12/1995 |

OTHER PUBLICATIONS

European Patent Office, European Supplementary Search Report, EP 13705374.0, Aug. 26, 2013, 3 pages.

Cascade Corporation. Int'l Search Report and Written Opinion, PCT/US13/21557, Mar. 19, 2013, 8 pages.

* cited by examiner

CARTON CLAMP ARM WITH ADJUSTABLE PIVOT BLOCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of the filing date of U.S. Provisional Patent Application Ser. No. 61/621,927, filed Apr. 9, 2012.

BACKGROUND AND SUMMARY OF THE INVENTION

The present invention relates to a carton clamp for lift trucks, for use in hoisting and handling loads in warehouses and the like in the form of packages such as large household appliances packed in corrugated cardboard cartons.

Lift trucks used for handling goods in warehouses and similar places may be equipped with specialized attachments intended to grip various types of loads securely. A lift truck may have a carton clamp including a pair of upright generally planar clamp arm assemblies extending forward from the lift truck and supporting generally parallel opposed clamp pads. The clamp arms are movable toward or away from each other laterally of the lift truck in order to grip or release a load such as a large carton enclosing a household appliance. Clamp pads carried on clamp arms of such a carton clamp are generally approximately flat and upright, and may have a height of about four feet (1.2 m) and a front-to-rear length of about four or five feet (1.2-1.5 m). Clamp pads may be unitary or provided as two separate clamp pad sections mounted on each clamp arm, one ahead of the other. A clamp pad may have a gripping surface of a resilient, non-slip material intended to be pressed against and grip a container or carton.

While most cartons or similar containers have parallel upright sides, because of the nature of the goods inside the carton and other packing material within the outer skin of a carton, it may be desirable to provide pressure against the exterior of a carton of a certain type in an uneven distribution, such as by providing greater pressure near the bottom of a carton and lesser pressure near the top of the part of the carton engaged by the clamp arm assembly.

It is desirable for the clamp pad or clamp pads to be free to at least a small extent, to articulate about a vertical axis in order to accommodate clamp arm deflection and conform better to the shape of a carton and, to some extent, the contents of the carton. This capability is addressed in prior art Link, U.S. Pat. No. 3,643,827, for example, which discloses clamp pads mounted on carton clamp arms in a way which allows a small amount of articulation about a vertical axis.

European patent EP 1 997 771 B1 discloses a lift truck clamping attachment for handling cartons in which clamping pads are preloaded to be elastically deformed and present a concave surface toward the surface of a carton to be grasped. The pressure provided by the clamp jaws is intended to provide uniform distribution of the clamping pressure on the packages to be hoisted and transported so that there are no important specific pressure gradients with respect to the average value of pressure against a package being grasped.

In some cases, however, rather than having a uniform pressure exerted over the entire surface contacted by a clamp pad, it is desired to have a definite pressure gradient, or to provide greater pressure in a particular part of the clamp pad. In accordance with the present disclosure two or more, and preferably three, coaxial pivoting clamp pad mounts, or support assemblies, are carried on a carton clamp arm and provide adjustable spacing between the axis of rotation defined by the coaxial pivoting support assembly and a clamp pad supported by the mounts, so that a radial distance away from the axis of rotation of the pivoting support assembly can be adjusted to mount a clamp pad at a desired attitude, varying from the orientation of the pivot axis by a small angle in order to provide a definite pressure gradient between an uppermost part and a lowermost part of a clamp pad as it is urged into contact against an outer surface of a carton to be grasped by the carton clamp assembly. Alternatively, the pivoting clamp pad support assemblies can be adjusted to provide radial spacing between the pivot axis and a particular part of a clamp pad that will result in a greater pressure at either or both of the top and bottom, or at a mid-height location, or at the front or the rear, of a clamp pad.

The foregoing and other features of the invention will be more readily understood upon consideration of the following detailed description of the invention, taken in conjunction with the accompanying drawings.

DETAILED DESCRIPTION OF A PREFERRED EMBODIMENT

Figure 1:
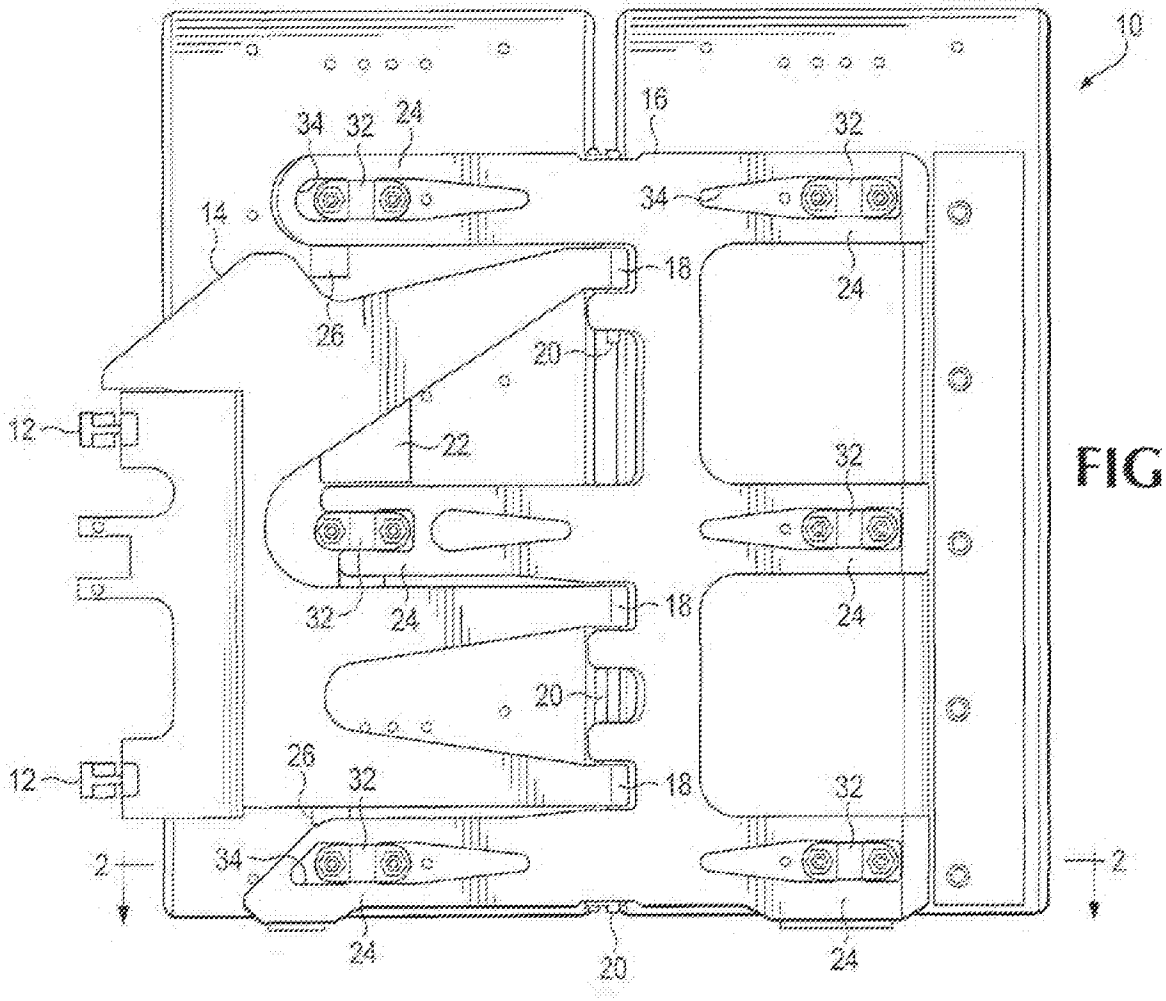
FIG. 1 is a side elevational view of a clamp arm assembly for a lift truck, including clamp pads mounted on the clamp arm assembly with the use of adjustable pivoting clamp pad support assemblies.
Figure 2:
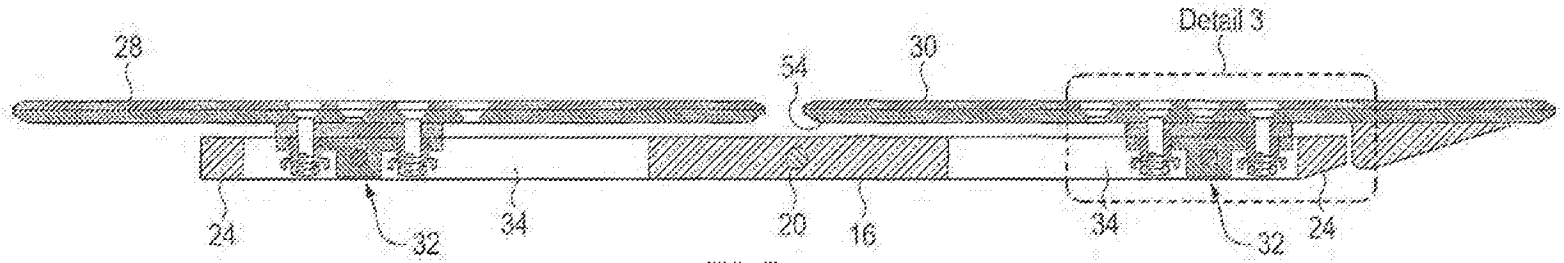
FIG. 2 is a sectional view of the clamp arm assembly, taken along line 2-2 in FIG. 1.

Referring first to FIGS. 1 and 2 of the drawings, a carton clamp arm assembly 10 for a lift truck includes transversely oriented horizontal members 12 adapted to be attached to a front of a lift truck (not shown), to permit the clamp arm assembly 10 to move transversely with respect to the lift truck, so that a pair of opposed clamp arm assemblies 10 can move toward or away from each other to grip or release a load. Carried on the [transverse] *transversely oriented horizontal* members 12 is a clamp arm 14 that extends forward from the lift truck when the clamp arm assembly 10 is mounted on a lift truck for use. A load stabilizer 16 is mounted on the outer ends 18 of the clamp arm 14, and the load stabilizer 16 is attached to the outer ends 18 by coaxial pins 20 defining a substantially vertical pivot axis of a hinge-like connection, that allows the stabilizer 16 to pivot about the coaxial pins 20, to allow for deflection of the clamp arm 14 or misalignment of a package to be gripped. The stabilizer 16 may be a substantial steel member with a generally vertical central trunk portion and respective sets of three horizontal finger-like members 24 extending forwardly and rearwardly from the trunk. A spring 22 is mounted on one of the finger-like portions 24 of the load stabilizer 16 and presses against an inner face of the clamp arm 14, tending to rotate the load stabilizer 16 about the coaxial pins 20, while a pair of stop members 26 mounted on the clamp arm 14 limit angular movement of the load stabilizer 16 to a slightly toed-out attitude.

A carton clamp pad, or load-contact pad, may be a unitary member or may, as shown, have the form of two large generally rectangular and substantially flat load-contact pad members 28 and 30 of a split load-contact pad. The load-contact pad members 28 and 30 are carried respectively on the rearwardly-extending and forwardly-extending finger-like horizontal members 24 of the load stabilizer 16. Each of the load-contact or carton clamp pad members 28 and 30 is attached to the load stabilizer 16 by three adjustable pivoting clamp pad support assemblies 32, also called adjustable pivot assemblies, each of which is mounted within a receptacle 34 defined by a respective one of the finger-like horizontal members 24.

Figure 3:
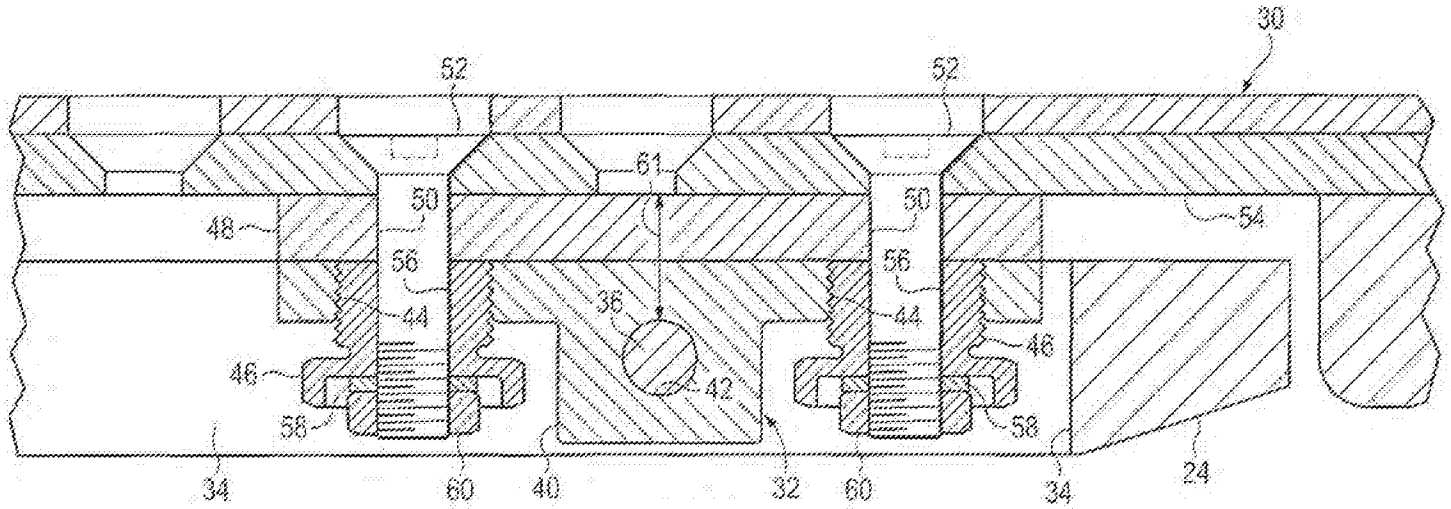
FIG. 3 is a detail view showing a portion of FIG. 2 at an enlarged scale.
Figure 4:
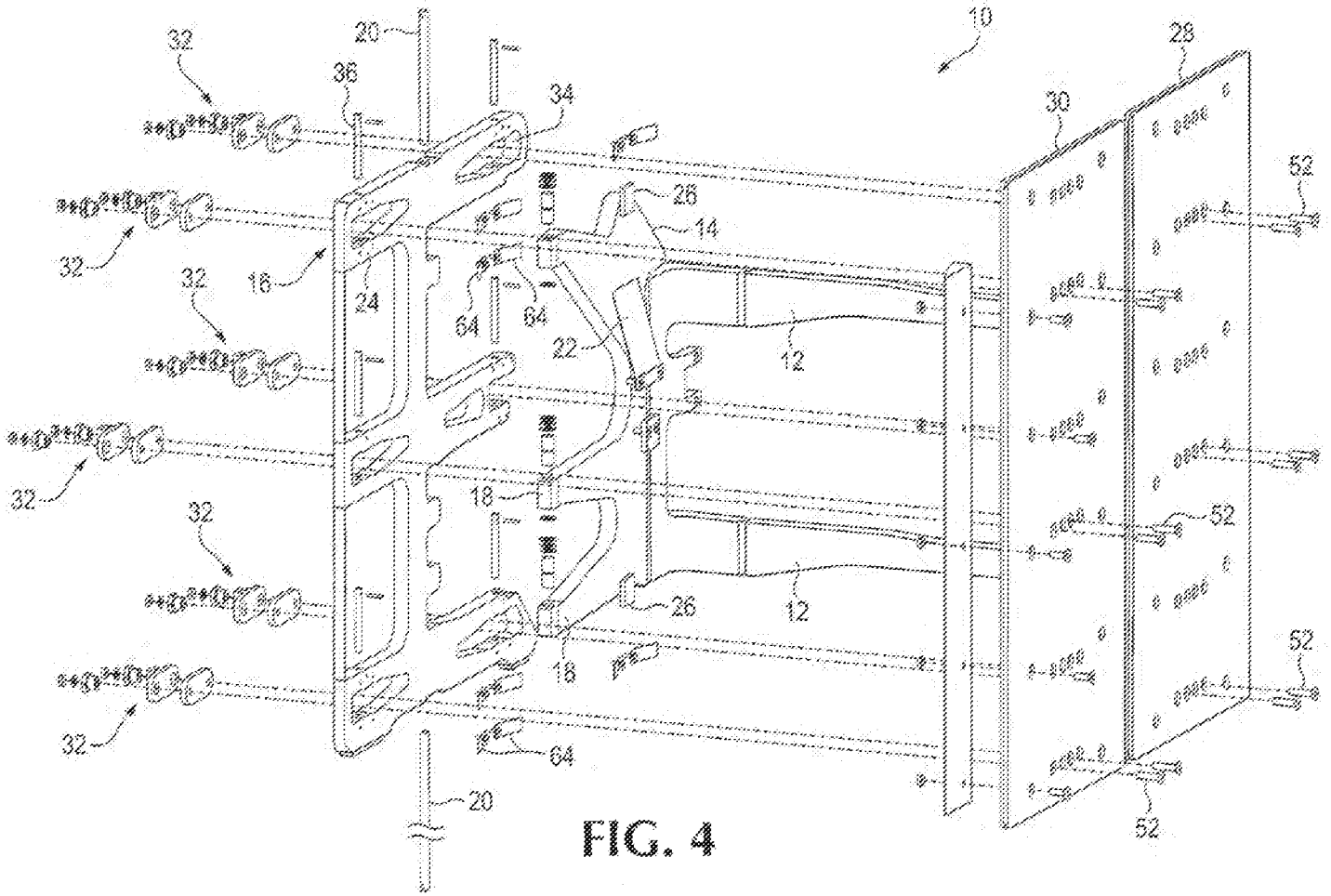
FIG. 4 is an exploded isometric view of the clamp arm and clamp pad assembly shown in FIG. 1, taken from the upper left front.
Figure 5:
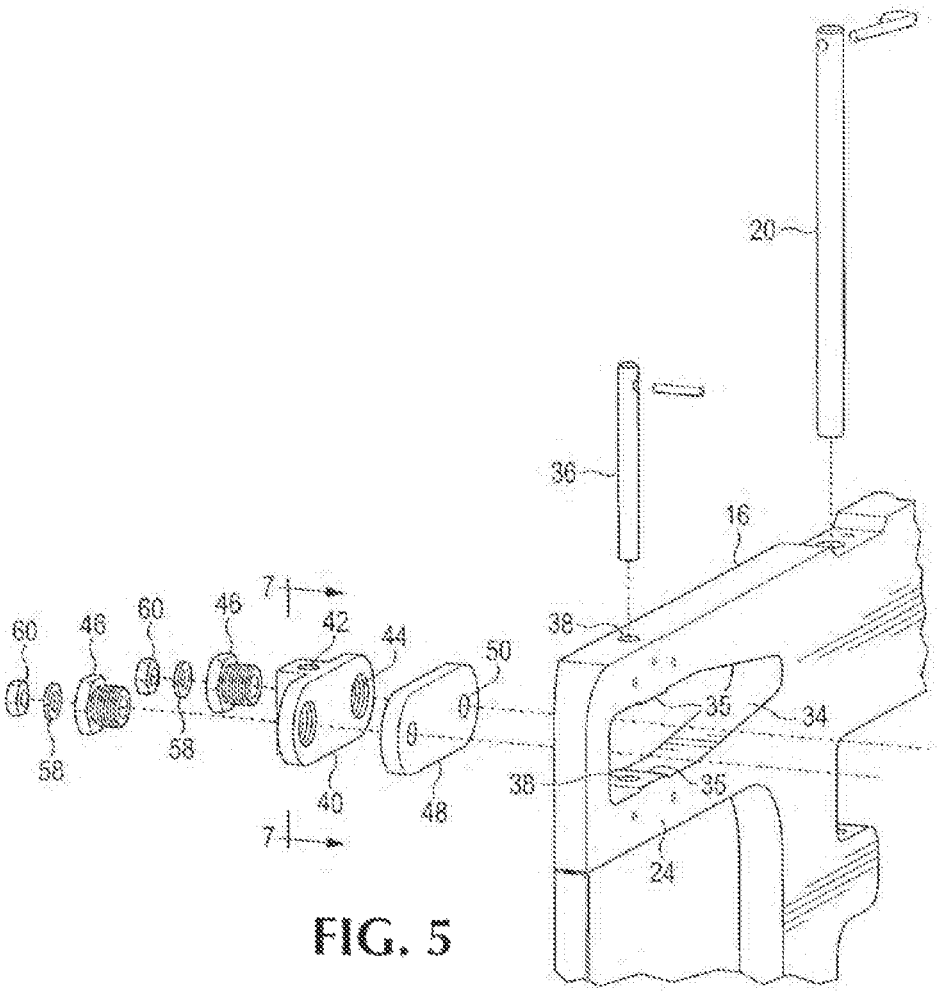
FIG. 5 is a detail view at an enlarged scale, showing a portion of FIG. 4 including one of the adjustable pivoting clamp pad support assemblies.

Referring also to FIGS. 3, 4, and 5, each of the receptacles 34 may be an opening extending through the respective finger-like portion 24 of the stabilizer 16.

For each of the separate carton clamp pad members 28 and 30 a pivot axis is defined by pivot pins 36 extending coaxially and vertically through bores 38 in the respective finger-like members 24 supporting the clamp pad 28 or 30 and securing the respective adjustable pivoting clamp pad support assemblies 32 in the receptacles 34.

As shown best in FIG. 5, each receptacle 34 may include a pair of upper and lower opposed horizontal bearing faces 35 to receive the respective adjustable pivot assembly 32, and the bores 38 for the pivot pins 36 extend through the bearing faces 35.

Figure 6:
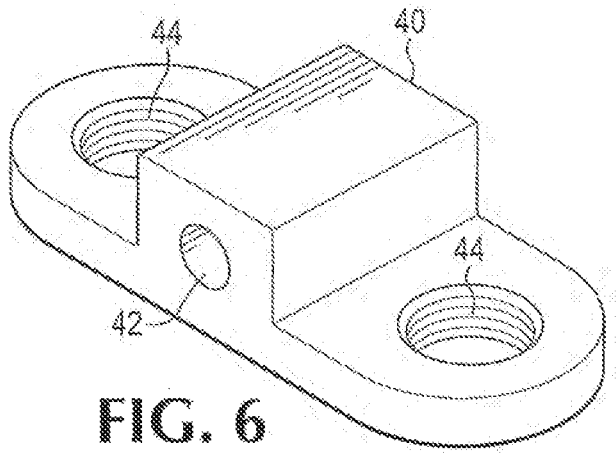
FIG. 6 is an isometric view of a pivot block such as the ones shown in FIGS. 3 and 5.
Figure 7:
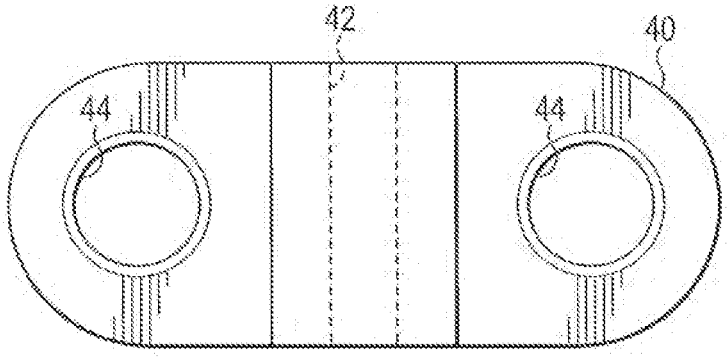
FIG. 7 is an elevational view of the pivot block shown in FIG. 6, taken in the direction of the line 7-7 in FIG. 5.
Figure 8:
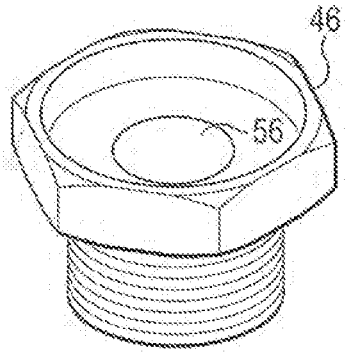
FIG. 8 is an isometric view of a threaded collar included in one of the adjustable pivoting clamp pad support assemblies.

Each adjustable pivoting clamp pad support assembly 32 includes a bearing block 40 defining a pin bore 42 to receive a pivot pin 36 as may be seen in FIGS. 6 and 7. A pair of threaded bores 44 extend through a flat base of the bearing block 40 in a direction perpendicular to the axis of the pin bore 42. A collar 46, also shown in FIG. 8, which has external threads and which has a portion shaped to be engaged by a wrench, is threaded into each of the bores 44 as may be seen in FIGS. 3 and 5 and acts as a positioning member, as is described below.

A flat spacer plate 48, which may have a shape similar to that of the base of the bearing block 40, defines a pair of bores 50 preferably smaller than the bores 44 and located coaxially aligned with the bores 44 in the bearing block 40. Fasteners such as cap screws 52 may be countersunk in and extend through a supporting plate portion 54 of the clamp pad 28 or 30, through the bores 50 in the spacer plate 48, and through the bores 56 defined by the collars 46. A lock-washer 58 and a self locking nut 60 may be provided on the cap screw 52 and tightened against the collar 46 to retain the cap screw 52 with the clamp pad 28 or 30 held tightly against the spacer plate 48 as shown in FIG. 3 and to keep the spacer plate 48 from moving with respect to the collar 46.

As shown in FIG. 3 an inner end of the collar 46 is flush with or may be recessed from the inner surface of the bearing block 40, and the spacer plate 48 rests tightly against the inner face of the bearing block 40. Thus as shown in FIG. 3 a minimum radial distance 61 is defined by the spacer plate 48 between the pivot pin 36 and the plate 54 of the clamp pad 30.

Figure 9:
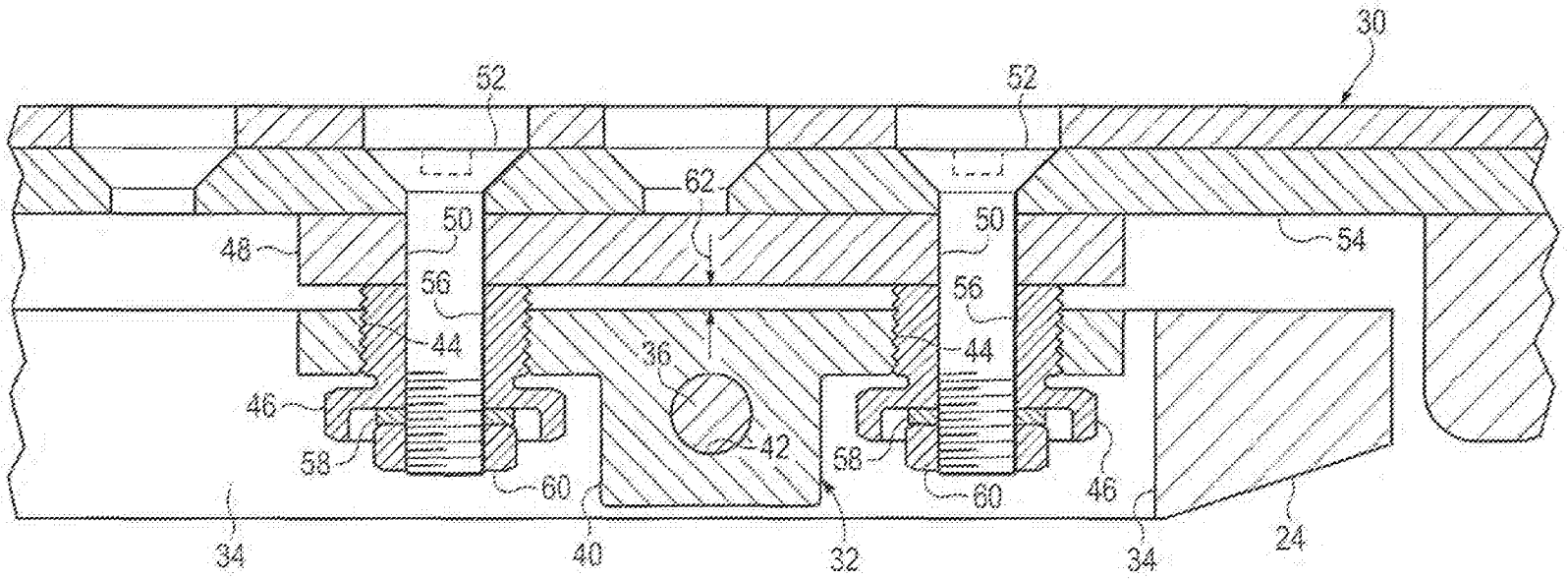
FIG. 9 is a view similar to FIG. 3, showing the pivoting clamp pad support assembly adjusted to a different setting.

With the adjustable pad support assemblies 32 all assembled as is the one shown in FIG. 3, both of the clamp pad members 28 and 30 are parallel with the central axes defined by the pivot pin bores 38 and pin bores 42 and thus are positioned so as to provide equal pressure along the entire height of the respective clamp pad 28 or 30 against a vertical side of a carton to be gripped by the carton clamp. The orientation of, and to some extent the shape of, each clamp pad 28 or 30 may be varied, however, by adjusting the clamp pad support assemblies 32 to provide additional spacing between the clamp pad plate portion 54 and the axis of the pin bore 42, as shown in FIG. 9. The adjustable pad support assemblies 32 may be adjusted by loosening the lock nuts 58 from the cap screws 52, relieving pressure from the collars 46. The collars 46 may then be screwed in farther through the base of the bearing block 40 causing the inner end of each collar to bear against the spacer plate 48 and establish a selected position of the adjacent part of a clamp pad plate portion 54 by creating a gap distance 62 between the spacer plate 48 and the base of the bearing block 40, within a range of available positions determined by the length of the collars 46 and the distance to which they can be made to protrude beyond the inner face of the bearing block 48. The lock nuts 60 may then be tightened against the lock washers 58 and the depressed face of the respective collar 46, to keep the spacer plate positioned tightly against the inner ends of the collars 46, establishing and maintaining the gap 62 between the bearing block 40 and the spacer plate 48.

There are pairs of springs 64 shown in FIG. 4 that tend to keep the clamp pads 28 and 30 approximately parallel with the respective finger-like portions 24 of the stabilizer 16. Once the carton clamp arm assembly 10 is moved laterally to bring a clamp pad 28 or 30 into contact against a generally vertical and planar surface of a carton the force of a spring 64 is easily overcome, and the clamp pad can turn around the pivot pins of the adjustable clamp pad support assemblies 32 to conform to the carton. At the same time, however, where one of the adjustable clamp pad support assemblies 32 has been adjusted to provide a greater gap distance 62 than is provided in other clamp pad support assemblies the clamp pad 28 or 30 will exert greater pressure against a flat side of a carton or other load than where the respective clamp pad support assembly 32 does not have such a gap distance.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A carton clamp arm assembly, comprising:

(a) a clamp arm having an outer end;

(b) a load stabilizer mounted on said outer end of said clamp arm and movable with respect to said clamp arm through at least a small angle about a vertical pivot axis extending through said outer end of said clamp arm;

(c) a plurality of clamp pad support assemblies mounted on said load stabilizer, each of said clamp pad support assemblies being movable with respect to said load stabilizer about a respective vertical pivot axis, and said respective vertical pivot axes of at least two of said clamp pad assemblies being coaxial with each other; and (d) a carton clamp pad carried by said load stabilizer and attached thereto by said plurality of clamp pad support assemblies, at least one of said clamp pad support assemblies being adjustable to establish a selected distance within a range of distances between a related part of the carton clamp pad and said respective vertical pivot axis of said at least one of said clamp pad support assemblies.

2. The carton clamp arm assembly of claim 1 wherein said load stabilizer includes a vertical central trunk member, a first plurality of elongate horizontal members extending forwardly, and a second plurality of elongate horizontal members extending rearwardly from said central trunk member, each of said elongate horizontal members having one of said clamp pad support assemblies mounted thereon.

3. The carton clamp arm assembly of claim 2 wherein said plurality of said clamp pad support assemblies are mounted on a plurality of respective ones of said first plurality of elongate horizontal members extending forwardly from said vertical trunk member and wherein each one of said plurality of clamp pad support assemblies is movable about its respective pivot axis relative to a respective one of said first plurality of elongate horizontal members on which it is mounted.

4. The carton clamp arm assembly of claim 3 wherein the respective vertical pivot axis of each one of said plurality of clamp pad support assemblies mounted on said respective ones of said first plurality of elongate horizontal members is coaxially aligned with said respective vertical pivot axis of each other one of said plurality of clamp pad support assemblies mounted on said respective ones of said first plurality of elongate horizontal members.

5. The carton clamp arm assembly of claim 2 wherein said plurality of said clamp pad support assemblies are mounted on a plurality of respective ones of said second plurality of elongate horizontal members extending rearwardly from said vertical trunk member and wherein each one of said plurality of clamp pad support assemblies is movable about its respective pivot axis relative to a respective one of said second plurality of elongate horizontal members on which it is mounted.

6. The carton clamp arm assembly of claim 5 wherein the respective vertical pivot axis of each one of said plurality of clamp pad support assemblies mounted on said respective ones of said second plurality of elongate horizontal members is coaxially aligned with said respective vertical pivot axis of each other one of said plurality of clamp pad support assemblies mounted on said respective ones of said second plurality of elongate horizontal members.

7. The carton clamp arm assembly of claim 2 wherein one of said elongate horizontal members defines a receptacle and a respective one of said plurality of clamp pad support assemblies is mounted within said receptacle.

8. The carton clamp arm assembly of claim 7 wherein said receptacle includes an opening extending through said one of said elongate horizontal members and wherein said vertical pivot axis of said respective one of said carton clamp pad support assemblies is defined by a pin mounted in said one of said elongate horizontal members and extending into said opening.

9. The carton clamp arm assembly of claim 2 including a spring mounted on one of said elongate horizontal members and arranged to tend to keep said carton clamp pad parallel with said one of said elongate horizontal members to which said carton clamp pad is attached.

10. The carton clamp arm assembly of claim 1 including a spring carried on one of said load stabilizer and said clamp arm and urging said load stabilizer about said vertical pivot axis toward a toed-out orientation with respect to said clamp arm.

11. The carton clamp arm assembly of claim 1 in combination with an opposite second carton clamp arm assembly, one of said carton clamp arm assembly and said second carton clamp arm assembly being mounted on a transversely-oriented horizontal member for movement toward and away from the other one of said carton clamp arm and said second carton clamp assembly along said transversely-oriented horizontal member.

12. A carton clamp arm assembly, comprising:

(a) a clamp arm having an outer end;

(b) a load stabilizer mounted on said outer end of said clamp arm and movable with respect to said clamp arm through at least a small angle about a vertical pivot axis extending through said outer end of said clamp arm;

(c) a plurality of clamp pad support assemblies mounted on said load stabilizer;

(d) a carton clamp pad carried by said load stabilizer and attached thereto by said plurality of clamp pad support assemblies, at least one of said clamp pad support assemblies being adjustable to establish a selected distance, within an available range, between a related part of the carton clamp pad attached to said at least one of said plurality of clamp pad support assemblies and a part of the load stabilizer on which said at least one of said plurality of clamp pad support assemblies is mounted; and (e) wherein one of said clamp pad support assemblies includes a bearing block defining a pivot axis about which said clamp pad support assembly can pivot with respect to said load stabilizer, said one of said clamp pad support assemblies also including a distance adjustment assembly for establishing said selected distance between said related part of the carton clamp pad and said part of the load stabilizer, said distance adjustment assembly including a positioning member in threaded engagement in said bearing block and extending by an adjustable distance from said bearing block, and including a fastener engaged with said positioning member and connected with said clamp pad so as to interconnect said clamp pad with the positioning member.

13. The carton clamp arm assembly of claim 12 wherein said distance adjustment assembly includes a locking fastener engaged with said positioning member and securing said locking fastener to said positioning member with said positioning member in a selected position of adjustment to establish said selected distance.

14. The carton clamp arm assembly of claim 12 wherein said pivot axis of said clamp pad support assembly is located centrally in said bearing block and said [load] clamp pad support assembly includes a pair of said distance adjustment assemblies located on respective opposite sides of said pivot axis.

15. A carton clamp arm assembly, comprising:

(a) a clamp arm having an outer end;

(b) a load stabilizer mounted on said outer end of said clamp arm and movable with respect to said clamp arm through at least a small angle about a vertical pivot axis extending through said outer end of said clamp arm;

(c) a carton clamp pad carried by said load stabilizer and attached thereto by a plurality of clamp pad support assemblies, at least one of said clamp pad support assemblies including a bearing block defining a pivot axis about which said clamp pad support assembly can pivot with respect to said load stabilizer, said one of said clamp pad support assemblies also including a distance adjustment assembly, said distance adjustment assembly including a positioning member in threaded engagement in said bearing block and extending by an adjustable distance from said bearing block, said distance adjustment assembly also including a fastener engaged with said positioning member and connected with said clamp pad so as to interconnect said clamp pad with the positioning member, said at least one of said clamp pad support assemblies thereby being adjustable to establish a selected distance within a range of available distances between a related part of the carton clamp pad and a related part of the load stabilizer.

16. The carton clamp arm assembly of claim 15 wherein said distance adjustment assembly includes a locking fastener engaged with said positioning member and securing said [locking] fastener to said positioning member with said positioning member in a selected position of adjustment to establish said selected distance.

17. The carton clamp arm assembly of claim 15 wherein said pivot axis of said clamp pad support assembly is located centrally in said bearing block and said load clamp pad support assembly includes a pair of said distance adjustment assemblies located on respective opposite sides of said pivot axis.

*18. A lift truck clamp arm assembly, comprising:*

*(a) a clamp arm having an outer end;*

*(b) a load stabilizer mounted on said outer end of said clamp arm and movable with respect to said clamp arm through at least a small angle about a pivot axis extending through said outer end of said clamp arm;*

*(c) a plurality of clamp pad support assemblies mounted on said load stabilizer;*

*(d) a clamp pad carried by said load stabilizer and attached thereto by said plurality of clamp pad support assemblies, at least one of said clamp pad support assemblies including a bearing block defining a pivot axis about which at least one of said plurality clamp pad support assemblies can pivot with respect to said load stabilizer, said at least one of said clamp pad support assemblies also including a distance adjustment assembly and being adjustable to establish a selected distance between a related part of the carton clamp pad and a related part of the load stabilizer within a range of available distances, said distance adjustment assembly including a positioning member in threaded engagement in said bearing block and said positioning member extending by an adjustable distance from said bearing block toward said clamp pad, and said clamp arm assembly including a fastener engaged with said clamp pad and connecting said clamp pad to said bearing block.*

*19. The lift truck clamp arm assembly of claim 18 wherein said fastener is engaged with said positioning member.*

*20. The lift truck clamp arm assembly of claim 18 wherein said load stabilizer includes a central trunk member, a first plurality of elongate members extending forwardly, and a second plurality of elongate members extending rearwardly from said central trunk member, each one of said clamp pad support assemblies being mounted on a respective one of said elongate members.*

*21. The lift truck clamp arm assembly of claim 20 wherein a plurality of said clamp pad support assemblies are mounted on a plurality of respective ones of said first plurality of elongate members extending forwardly from said central trunk member and wherein each one of said plurality of clamp pad support assemblies is movable about a respective pivot axis relative to a respective one of said first plurality of elongate members on which it is mounted.*

*22. The lift truck clamp arm assembly of claim 21 wherein the respective pivot axis of each one of said plurality of clamp pad support assemblies mounted on said respective ones of said first plurality of elongate members is coaxially aligned with said respective pivot axis of each other one of said plurality of clamp pad support assemblies mounted on said respective ones of said first plurality of elongate members.*

*23. The lift truck clamp arm assembly of claim 20 wherein said plurality of said clamp pad support assemblies are mounted on a plurality of respective ones of said second plurality of elongate members extending rearwardly from said central trunk member and wherein each one of said plurality of clamp pad support assemblies is movable about a respective pivot axis relative to a respective one of said second plurality of elongate members on which it is mounted.*

*24. The lift truck clamp arm assembly of claim 23 wherein the respective pivot axis of each one of said plurality of clamp pad support assemblies mounted on said respective ones of said second plurality of elongate members is coaxially aligned with said pivot axis of each other of said plurality of clamp pad support assemblies mounted on said respective ones of said second plurality of elongate members.*

*25. The lift truck clamp arm assembly of claim 20 wherein one of said elongate members defines a receptacle and a respective one of said plurality of clamp pad support assemblies is mounted within said receptacle.*

*26. The lift truck clamp arm assembly of claim 25 wherein said receptacle is an opening extending through one of said elongate members and said pivot axis of said respective one of said clamp pad support assemblies is defined by a pin mounted in said one of said elongate members and extending into said receptacle.*

*27. The lift truck clamp arm assembly of claim 18 wherein said pivot axis of said clamp pad support assembly is located centrally in said bearing block and said clamp pad support assembly includes a pair of said distance adjustment assemblies located on respective opposite sides of said pivot axis of said clamp pad support assembly.*

*28. The lift truck clamp arm assembly of claim 18 wherein said distance adjustment assembly includes a locking fastener engaged with said positioning member and securing said fastener to said positioning member and thereby keeping said positioning member extending by said adjustable distance to establish said selected distance.*

*29. The lift truck clamp arm assembly of claim 18 in combination with an opposite second lift truck clamp arm assembly, one of said lift truck clamp arm assembly and said second lift truck clamp arm assembly being mounted on a transversely-oriented horizontal member for movement*

*toward and away from the other one of said lift truck clamp arm assembly and said second lift truck clamp assembly along said transversely-oriented horizontal member.*

*30. A lift truck clamp arm assembly, comprising:*

*(a) a clamp arm having an outer end;*

*(b) a load stabilizer mounted on said outer end of said clamp arm;*

*(c) a plurality of clamp pad support assemblies mounted on said load stabilizer, each of said clamp pad support assemblies being movable with respect to said load stabilizer about a respective pivot axis; and*

*(d) a clamp pad carried by said load stabilizer and attached thereto by said plurality of clamp pad support assemblies, at least one of said clamp pad support assemblies including a distance adjustment assembly for establishing a selected distance within a range of distances between an adjacent part of the clamp pad and a respective pivot axis of said at least one of said clamp pad support assemblies, said distance adjustment assembly including a positioning member in threaded engagement in a part of said at least one of said clamp pad support assemblies and extending by an adjustable distance from said part of said at least one of said clamp pad support assemblies, and including a fastener engaged with said part of said at least one of said clamp pad support assemblies and connected with said clamp pad so as to interconnect said clamp pad with said part of said at least one of said clamp pad support assemblies.*

*31. The lift truck clamp arm assembly of claim 30 wherein said positioning member is said part of said at least one of said clamp pad support assemblies with which said fastener is engaged.*

*32. The lift truck clamp arm assembly of claim 30 wherein said distance adjustment assembly includes a locking fastener engaged with said fastener and securing said fastener in engagement with said positioning member, with said positioning member extending from said bearing block by said adjustable distance and thereby establishing said selected distance.*

*33. The lift truck clamp arm assembly of claim 30 wherein said load stabilizer includes a central trunk member, a first plurality of elongate members extending forwardly, and a second plurality of elongate members extending rearwardly from said central trunk member, a plurality of said elongate members each having one of said clamp pad support assemblies mounted thereon.*

*34. The lift truck clamp arm assembly of claim 33 wherein said plurality of said clamp pad support assemblies are mounted on a plurality of respective ones of said first plurality of elongate members extending forwardly from said central trunk member and wherein each one of said plurality of clamp pad support assemblies is movable relative to a respective one of said first plurality of elongate members on which it is mounted.*

*35. The lift truck clamp arm assembly of claim 34 wherein each one of said plurality of clamp pad support assemblies mounted on said respective ones of said first plurality of elongate members has a respective pivot axis that is coaxially aligned with a respective pivot axis of each other one of said plurality of clamp pad support assemblies mounted on said respective ones of said first plurality of elongate members.*

*36. The lift truck clamp arm assembly of claim 33 wherein a plurality of said clamp pad support assemblies are mounted on a plurality of respective ones of said second plurality of elongate members extending rearwardly from said trunk member and wherein each one of said plurality of clamp pad support assemblies is movable relative to a respective one of said second plurality of elongate members on which it is mounted.*

*37. The lift truck clamp arm assembly of claim 36 wherein each one of said plurality of clamp pad support assemblies mounted on said respective ones of said second plurality of elongate members has a respective pivot axis that is coaxially aligned with a respective pivot axis of each other one of said plurality of clamp pad support assemblies mounted on said respective ones of said second plurality of elongate members.*

*38. The lift truck clamp arm assembly of claim 33 wherein one of said elongate members defines a receptacle and a respective one of said plurality of clamp pad support assemblies is mounted within said receptacle.*

*39. The lift truck clamp arm assembly of claim 38 wherein said receptacle includes an opening extending through said one of said elongate members and wherein said respective one of said clamp pad support assemblies is attached to said one of said elongate members by a pin mounted in said one of said elongate members and extending into said opening.*

*40. The lift truck clamp arm assembly of claim 33 including a spring mounted on one of said elongate members and arranged to tend to keep said clamp pad parallel with said one of said elongate members to which said clamp pad is attached by one of said clamp pad support assemblies.*

*41. The lift truck clamp arm assembly of claim 30 wherein said at least one of said clamp pad support assemblies includes a bearing block defining a pivot axis about which said clamp pad support assembly can pivot with respect to said load stabilizer, said positioning member of said distance adjustment assembly being in threaded engagement in said bearing block and extending by said adjustable distance from said bearing block.*

*42. The lift truck clamp arm assembly of claim 41 wherein said distance adjustment assembly includes a locking fastener engaged with said positioning member and securing said fastener to said positioning member with said positioning member in a selected position of adjustment that establishes said selected distance.*

*43. The lift truck clamp arm assembly of claim 41 wherein said pivot axis of said clamp pad support assembly is located centrally in said bearing block and said clamp pad support assembly includes a pair of said distance adjustment assemblies located on respective opposite sides of said pivot axis.*

*44. The lift truck clamp arm assembly of claim 30 wherein said load stabilizer is movable with respect to said clamp arm through an angle about a pivot axis extending through said outer end of said clamp arm.*

*45. The lift truck clamp arm assembly of claim 30 in combination with an opposite second lift truck clamp arm assembly, one of said lift truck clamp arm assembly and said second lift truck clamp arm assembly being mounted on a transversely-oriented horizontal member for movement toward and away from the other one of said lift truck clamp arm and said second lift truck clamp arm assembly along said transversely-oriented horizontal member.*

*46. A lift truck clamp arm assembly, comprising:*

*(a) a clamp arm having an outer end;*

*(b) a load stabilizer mounted on said outer end of said clamp arm;*

*(c) a plurality of clamp pad support assemblies mounted on said load stabilizer;*

*(d) a clamp pad carried by said load stabilizer and attached thereto by said plurality of clamp pad support*

*assemblies, at least one of said clamp pad support assemblies being adjustable to establish a selected distance, within an available range, between an adjacent part of the clamp pad attached to said at least one of said plurality of clamp pad support assemblies and a part of the load stabilizer on which said at least one of said plurality of clamp pad support assemblies is mounted; and*

(*e*) *wherein one of said clamp pad support assemblies includes a bearing block defining a pivot axis about which said clamp pad support assembly can pivot with respect to said load stabilizer, said one of said clamp pad support assemblies also including a distance adjustment assembly for establishing said selected distance between said adjacent part of the clamp pad and said part of the load stabilizer, said distance adjustment assembly including a positioning member in threaded engagement in said bearing block and extending by an adjustable distance from said bearing block, and including a fastener engaged with said positioning member and connected with said clamp pad so as to interconnect said clamp pad with said positioning member.*

*47. The lift truck clamp arm assembly of claim 46 wherein said load stabilizer is movable with respect to said clamp arm through an angle about a pivot axis extending through said outer end of said clamp arm.*

*48. The lift truck clamp arm assembly of claim 46 wherein said distance adjustment assembly includes a locking fastener engaged with said fastener, and securing said fastener in engagement with said positioning member with said positioning member extending from said bearing block by said adjustable distance and thereby establishing said selected distance.*

*49. The lift truck clamp arm assembly of claim 46 wherein said pivot axis of said clamp pad support assembly is located centrally in said bearing block and said clamp pad support assembly includes a pair of said distance adjustment assemblies located on respective opposite sides of said pivot axis.*

*50. A lift truck clamp arm assembly, comprising:*

(*a*) *a clamp arm having an outer end;*

(*b*) *a load stabilizer mounted on said outer end of said clamp arm and movable with respect to said clamp arm through at least a small angle about a pivot axis extending through said outer end of said clamp arm;*

(*c*) *a plurality of clamp pad support assemblies mounted on said load stabilizer, each of said clamp pad support assemblies being movable with respect to said load stabilizer about a respective defined pivot axis, and said respective defined pivot axes of at least two of said clamp pad support assemblies being coaxial with each other; and*

(*d*) *a clamp pad carried by said load stabilizer and attached thereto by said plurality of clamp pad support assemblies, at least one of said clamp pad support assemblies being adjustable to establish a selected distance in a defined direction within a range of distances between a related part of the carton clamp pad and said respective defined pivot axis of at least one of said clamp pad support assemblies.*

*51. The lift truck clamp arm assembly of claim 50 wherein said load stabilizer includes a central trunk member, a first plurality of elongate members extending forwardly, and a second plurality of elongate members extending rearwardly from said central trunk member, each one of said clamp pad support assemblies being mounted on a respective one of said elongate members.*

*52. The lift truck clamp arm assembly of claim 51 wherein said plurality of said clamp pad support assemblies are mounted on a plurality of respective ones of said first plurality of elongate members extending forwardly from said central trunk member and wherein each one of said plurality of clamp pad support assemblies is movable about its respective defined pivot axis relative to a respective one of said first plurality of elongate members on which it is mounted.*

*53. The lift truck clamp arm assembly of claim 52 wherein the respective defined pivot axis of each one of said plurality of clamp pad support assemblies mounted on said respective ones of said first plurality of elongate members is coaxially aligned with said respective defined pivot axis of each other one of said plurality of clamp pad support assemblies mounted on said respective ones of said first plurality of elongate members.*

*54. The lift truck clamp arm assembly of claim 51 wherein said plurality of said clamp pad support assemblies are mounted on a plurality of respective ones of said second plurality of elongate members extending rearwardly from said central trunk member and wherein each one of said plurality of clamp pad support assemblies is movable about its respective defined pivot axis relative to a respective one of said second plurality of elongate members on which it is mounted.*

*55. The lift truck clamp arm assembly of claim 54 wherein the respective defined pivot axis of each one of said plurality of clamp pad support assemblies mounted on said respective ones of said second plurality of elongate members is coaxially aligned with said respective defined pivot axis of each other one of said plurality of clamp pad support assemblies mounted on said respective ones of said second plurality of elongate members.*

*56. The lift truck clamp arm assembly of claim 51 wherein one of said elongate members defines a receptacle and a respective one of said plurality of clamp pad support assemblies is mounted within said receptacle.*

*57. The lift truck clamp arm assembly of claim 56 wherein said receptacle includes an opening extending through said one of said elongate members and wherein said defined pivot axis of said respective one of said clamp pad support assemblies is defined by a pin mounted in said one of said elongate members and extending into said opening.*

*58. The lift truck clamp arm assembly of claim 50 wherein one of said clamp pad support assemblies includes a bearing block defining said defined pivot axis about which said clamp pad support assembly is movable with respect to said load stabilizer, said one of said clamp pad support assemblies also including a distance adjustment assembly for establishing said selected distance between said related part of the carton clamp pad and said defined pivot axis, said distance adjustment assembly including a positioning member in threaded engagement in said bearing block and extending by an adjustable distance from said bearing block, and including a fastener engaged with said bearing block and connected with said clamp pad so as to interconnect said clamp pad with said bearing block.*

*59. The lift truck clamp arm assembly of claim 58 wherein said distance adjustment assembly includes a locking fastener engaged with said positioning member and securing said fastener to said positioning member with said positioning member in a selected position of adjustment to establish said selected distance.*

*60. The lift truck clamp arm assembly of claim 58 wherein said defined pivot axis of said clamp pad support assembly is located centrally in said bearing block and said clamp pad*

*support assembly includes a pair of said distance adjustment assemblies located on respective opposite sides of said pivot axis.*

*61. The lift truck clamp arm assembly of claim 50 in combination with an opposite second carton clamp arm assembly, one of said carton clamp arm assembly and said second carton clamp arm assembly being mounted on a transversely-oriented member for movement toward and away from the other one of said carton clamp arm and said second carton clamp assembly along said transversely-oriented member.*

*62. A lift truck clamp arm assembly, comprising:*

*(a) a clamp arm having an outer end;*

*(b) a load stabilizer mounted on said outer end of said clamp arm and movable with respect to said clamp arm through at least a small angle about a pivot axis extending through said outer end of said clamp arm;*

*(c) a clamp pad carried by said load stabilizer and attached thereto by a plurality of clamp pad support assemblies, at least one of said clamp pad support assemblies including a bearing block defining a pivot axis about which said clamp pad support assembly can pivot with respect to said load stabilizer, said one of said clamp pad support assemblies also including a distance adjustment assembly, said distance adjustment assembly including a positioning member in threaded engagement in said bearing block and extending by an adjustable distance from said bearing block, said distance adjustment assembly also including a fastener engaged with said positioning member and connected with said clamp pad so as to interconnect said clamp pad with the positioning member, said at least one of said clamp pad support assemblies thereby being adjustable to establish a selected distance within a range of available distances in a defined direction between a related part of the carton clamp pad and a related part of the load stabilizer.*

*63. The lift truck clamp arm assembly of claim 62 wherein said distance adjustment assembly includes a locking fastener engaged with said positioning member and securing said fastener to said positioning member with said positioning member in a selected position of adjustment to establish said selected distance.*

*64. The lift truck clamp arm assembly of claim 62 wherein said pivot axis of said clamp pad support assembly is located centrally in said bearing block and said clamp pad support assembly includes a pair of said distance adjustment assemblies located on respective opposite sides of said pivot axis.*

* * * * *